United States Patent
Lin et al.

(10) Patent No.: US 9,102,474 B2
(45) Date of Patent: Aug. 11, 2015

(54) ROTATION MECHANISM

(71) Applicant: INDUSTRIAL TECHNOLOGY RESEARCH INSTITUTE, Hsinchu (TW)

(72) Inventors: Wei-Chu Lin, Taichung (TW); Mei-Chin Chou, Taichung (TW); Yu-Shiang Huang, Chiayi County (TW); Hsin-Chuan Su, Taichung (TW); Hsi-Hung Hsiao, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 21 days.

(21) Appl. No.: 14/176,998

(22) Filed: Feb. 10, 2014

(65) Prior Publication Data
US 2015/0139759 A1   May 21, 2015

(30) Foreign Application Priority Data

Nov. 20, 2013 (TW) .............................. 102142276 A

(51) Int. Cl.
 *B23Q 7/14* (2006.01)
 *B65G 29/00* (2006.01)
 (Continued)

(52) U.S. Cl.
 CPC *B65G 29/00* (2013.01); *B23Q 7/02* (2013.01); *B23Q 7/1431* (2013.01); *F16C 19/163* (2013.01); *F16C 19/44* (2013.01)

(58) Field of Classification Search
 CPC .................................................. B23Q 7/1431
 See application file for complete search history.

(56) References Cited

U.S. PATENT DOCUMENTS 4,797,052 A * 1/1989 Ohta et al. ................. 414/744.3
4,934,031 A   6/1990 Maeda et al.
(Continued)

FOREIGN PATENT DOCUMENTS

CN   100479982   4/2009
TW     393367 B   6/2000
(Continued)

OTHER PUBLICATIONS

Zhang, Yongqiang, APC device movement sequence Fault Diagnosis Repair Maintenance, 2010, p. 93-95, China.
(Continued)

*Primary Examiner* — Gene Crawford
*Assistant Examiner* — Thomas Randazzo
(74) *Attorney, Agent, or Firm* — Locke Lord LLP; Tim Tingkang Xia, Esq.

(57) ABSTRACT

A rotation mechanism includes a mandrel, a rotation axle, a needle roller bearing and an angular bearing. The mandrel includes a shaft portion, a first annular contact portion and a second annular contact portion. The shaft portion has an outer surface, and the first annular contact portion and the second annular contact portion are located on the outer surface and respectively surround the axis of the mandrel. The rotation axle includes an annular portion, a third annular contact portion and a fourth annular contact portion. The annular portion has a shaft hole and an inner surface forming the shaft hole. The third annular contact portion and the fourth annular contact portion are located on the inner surface, and the mandrel passes through the shaft hole. The needle roller bearing is in contact with the first annular contact portion and the third annular contact portion, and is located between them.

11 Claims, 4 Drawing Sheets

(51) Int. Cl.
  *F16C 19/44* (2006.01)
  *F16C 19/16* (2006.01)
  *B23Q 7/02* (2006.01)

(56) References Cited

U.S. PATENT DOCUMENTS

| | | | |
|---|---|---|---|
| 5,156,254 A * | 10/1992 | Kitamura et al. | 198/346.1 |
| 5,368,150 A * | 11/1994 | Okada et al. | 198/346.1 |
| 5,622,247 A * | 4/1997 | Yamada | 198/346.1 |
| 5,803,229 A * | 9/1998 | Hosokawa | 198/345.3 |
| 6,148,988 A * | 11/2000 | Lin et al. | 198/346.1 |
| 6,293,742 B1 * | 9/2001 | Miyagi et al. | 409/132 |
| 6,513,640 B2 * | 2/2003 | Nishii | 198/346.1 |
| 7,694,799 B2 | 4/2010 | Bae | |
| 2006/0151287 A1 | 7/2006 | Bae | |
| 2008/0247698 A1 * | 10/2008 | Albert | 384/493 |
| 2011/0135229 A1 * | 6/2011 | Ito et al. | 384/457 |
| 2012/0207418 A1 * | 8/2012 | Friedrich et al. | 384/523 |

FOREIGN PATENT DOCUMENTS

| | | |
|---|---|---|
| TW | 404289 U | 9/2000 |
| TW | M449049 | 3/2013 |

OTHER PUBLICATIONS

Li Shaoping et al., Research on Positioning Device of Auto-change Table for Double Station Horizontal Machining Center, 2013, p. 25-27, 1001-3881(2013)2-025-3, vol. 41, No. 2, China.

Yong Feng Du et al., Driving Mechanism of Pallet Changer of Horizontal Machining Center, 2010, p. 7-9, 1000-4998 (2010)06-0007-03, China.

Wang Hai, Improvement of Dual-Operational Exchange Pallets of μ1000_630H Horizontal Machining Center, 2009, p. 40-41, 1002-2333(2009)03-0040-02, China.

Xie Yan-Cai et al., Optimal Improved Design of Table Exchange Device for Horizontal Machining Center, 2011, p. 98-100, 1001-2265(2011)06-0098-03, No. 7, China.

* cited by examiner

ROTATION MECHANISM

CROSS-REFERENCE TO RELATED APPLICATIONS

This non-provisional application claims priority under 35 U.S.C. §119(a) on Patent Application No(s). 102142276 filed in Taiwan, R.O.C. on Nov. 20, 2013, the entire contents of which are hereby incorporated by reference.

TECHNICAL FIELD

The disclosure relates to a rotation mechanism.

BACKGROUND

Both the three-axis machine and the five-axis machine need to be equipped with an automatic pallet changer (APC) in order to improve the processing efficiency. The APC comprises a rotary stage capable of quickly replacing the workpiece by its rotation mechanism. The rotary stage usually comprises a fixed axle and a rotation axle. A bearing is disposed between the fixed axle and the rotation axle in order to reduce the friction between them, thereby improving the stability of the rotary stage and reducing its abrasion. Nonetheless, when the workpiece is not evenly distributed on the rotary stage, the rotary stage in rotation shakes because the bearing of the rotary stage is uneven.

Therefore, it is important to solve the problem caused by uneven weight distribution of the work piece on the rotary stage because this may improve the stability and the durability of the rotary stage.

SUMMARY

A rotation mechanism comprises a mandrel, a rotation axle, a needle roller bearing and an angular bearing. The mandrel comprises a shaft portion, a first annular contact portion and a second annular contact portion. The shaft portion has an outer surface, and the first annular contact portion and the second annular contact portion are located on the outer surface and respectively surround the axis of the mandrel. The rotation axle comprises an annular portion, a third annular contact portion and a fourth annular contact portion. The annular portion has a shaft hole and an inner surface forming the shaft hole. The third annular contact portion and the fourth annular contact portion are located on the inner surface, and the mandrel passes through the shaft hole. The needle roller bearing is in contact with the first annular contact portion and the third annular contact portion, and is located between them. The angular bearing is in contact with the second annular contact portion and the fourth annular contact portion, and is located between the outer surface and the inner surface.

BRIEF DESCRIPTION OF THE DRAWINGS

The present disclosure will become more fully understood from the detailed description given hereinbelow, along with the accompanying drawings which are for illustration only, thus are not limitative of the present disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
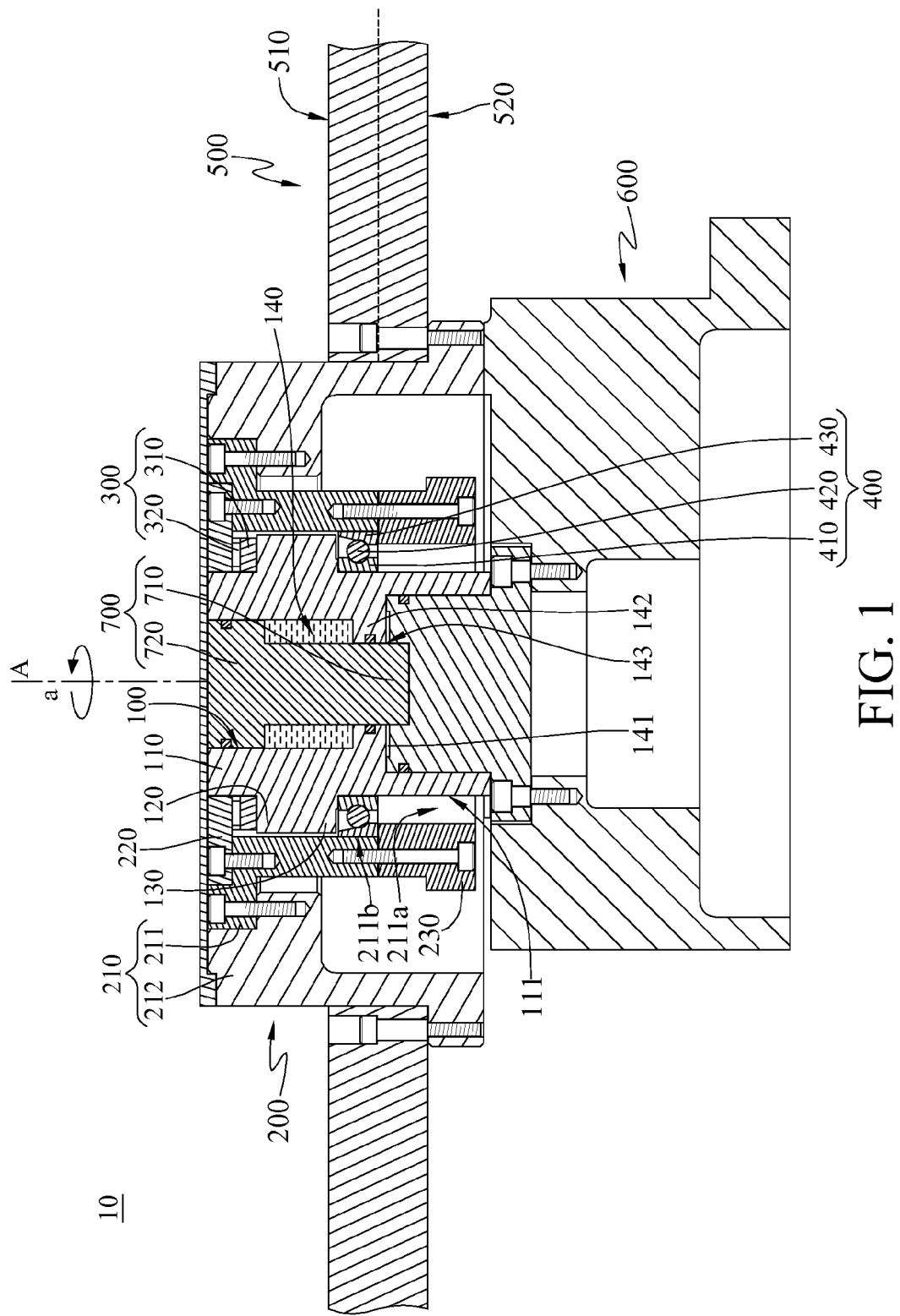
FIG. 1 is a sectional view of a rotation mechanism according to an embodiment of the disclosure.
Figure 2:
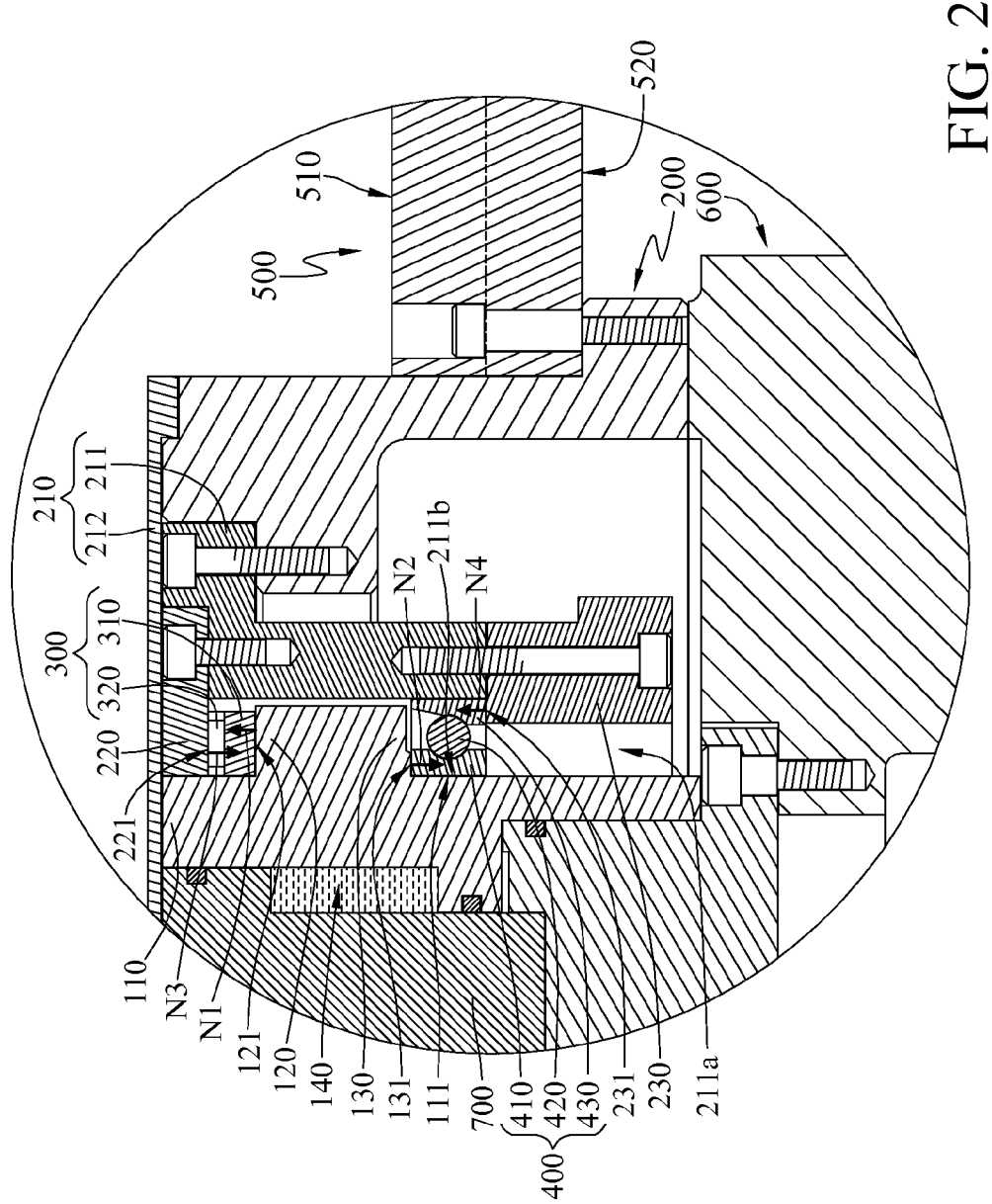
FIG. 2 is a partially enlarged view of FIG. 1.

FIG. 1 is a sectional view of a rotation mechanism according to an embodiment of the disclosure; FIG. 2 is a partially enlarged view of FIG. 1. As seen in FIG. 1 and FIG. 2, the rotation mechanism 10 is an automatic pallet changer (APC), but it is not limited thereto. The rotation mechanism 10 comprises a mandrel 100, a rotation axle 200, a needle roller bearing 300, an angular bearing 400 and a tray 500.

The mandrel 100 comprises a shaft portion 110, a first annular contact portion 120 and a second annular contact portion 130. The shaft portion 110 has an outer surface 111, the first annular contact portion 120 and the second annular contact portion 130 are located on the outer surface 111 of the shaft portion 110. The first annular contact portion 120 and the second annular contact portion 130 may be blocks or grooves. In this embodiment, the first annular contact portion 120 and the second annular contact portion 130 are blocks and they are formed as a single unit. The first annular contact portion 120 has a first contact surface 121 and the second annular contact portion 130 has a second contact surface 131. The first contact surface 121 and the second contact surface 131 respectively surround the axis A of the mandrel 100, and both the normal vector of the first contact surface 121 and the normal vector of the second contact surface 131 are parallel to the axis A of the mandrel 100.

The rotation axle 200 comprises an annular portion 210, a third annular contact portion 220 and a fourth annular contact portion 230. The annular portion 210 has an inner shell 211 and an outer shell 212. The inner shell 211 has a shaft hole 211a and an inner surface 211b forming the shaft hole 211a. The outer shell 212 surrounds the inner shell 211 and is fixed to the inner shell 211 by screws. The third annular contact portion 220 and the fourth annular contact portion 230 are located on the inner surface 211b on the annular portion 210. The third annular contact portion 220 has a third contact surface 221 while the fourth annular contact portion 230 has a fourth contact surface 231. The third contact surface 221 and the fourth contact surface 231 respectively surround the axis A of the mandrel 100, and both the normal vector of the third contact surface 221 and the normal vector of the fourth contact surface 231 are parallel to the axis A of the mandrel 100. In this embodiment, the third annular contact portion 220 and the fourth annular contact portion 230 are detachably installed on the opposite sides of the inner shell 211 respectively, thereby facilitating the assembly of the rotation mechanism 10. The mandrel 100 penetrates the shaft hole 211a. The first contact surface 121 faces the third contact surface 221 while the second contact surface 131 faces the fourth contact surface 231.

The needle roller bearing 300 comprises a frame body 310 and a plurality of needle rollers 320. The needle rollers 320 are rotatably disposed on the frame body 310 and the axes of the needle roller 320 intersect and are perpendicular to the axis A of the mandrel 100. The needle rollers 320 are in contact with and are located between the first contact surface 121 and the third contact surface 221. Since the contact area of the needle roller 320 with the first contact surface 121 and the inner shell 211 is larger than that of the balls 420 with the first contact surface 121 and the third contact surface 221, the needle roller bearing 300 is able to resist the large external force along the axial direction and the bending force caused by uneven weight distribution of a work piece (not shown).

Moreover, the vertical thickness of the needle roller bearing 300 is small, so that the room for objects on the mandrel 100 and the rotation axle 200 is enlarged.

The angular bearing 400 is an angular contact ball bearing or an angular roller bearing. In this embodiment, the angular bearing 400 is the angular contact ball bearing, but it is not limited thereto. In other embodiments, the angular bearing 400 can be the angular roller bearing, though the angular contact ball bearing is easier to be assembled than the angular roller bearing. The angular bearing 400 comprises a first annular fixed frame 410, a second annular fixed frame 430 and a plurality of balls 420. The second annular fixed frame 430 surrounds the first annular fixed frame 410 and the balls 420 are rotatably disposed between the first annular fixed frame 410 and the second annular fixed frame 430, so that the second annular fixed frame 430 can rotate relative to the first annular fixed frame 410. The angular bearing 400 is in contact with the second annular contact portion 130 and the fourth annular contact portion 230, and is located between them. Additionally, the angular bearing 400 is also located between the outer surface 111 and the inner surface 211b. Specifically, the second contact surface 131 and the outer surface 111 are respectively in contact with the opposite sides of the first annular fixed frame 410, while the fourth contact surface 231 and the inner surface 211b are respectively in contact with the opposite sides of the second annular fixed frame 430. Thereby, the angular bearing 400 can resist axial force and radial force between the mandrel 100 and the rotation axle 200.

The rotation axle 200 passes through the tray 500 which is fixed to the outer shell 212. The tray 500 has a carrying surface 510 and the bottom surface 520 that are opposite to each other. The carrying surface 510 is used for carrying objects. The center of the balls 420 is located between the extending surface of the carrying surface 510 and the extending surface of the bottom surface 520. To have a better resistance to the radial force, in this embodiment, the position of the center of the balls 420 is closer to the carrying surface 510. That is, the distance between the center of the balls 420 and the carrying surface 510 is less than the distance between the center of the balls 420 and the bottom surface 520.

In this and some other embodiments, the rotation mechanism 10 further comprises a base 600 and a piston 700. The bottom surface 520 of the tray 500 faces the base 600. The piston 700 has a main body 710 and a rod 720. One end of the rod 720 is connected to the base 600, while the other end of the rod 720 is connected to the main body 710. The mandrel 100 is fixed to the base 600. The mandrel 100 has a first oil chamber 140, a second oil chamber 141 and an annular flange 142. The second oil chamber 141 is located below the first oil chamber 140. The annular flange 142 is between the first oil chamber 140 and the second oil chamber 141, and has a through hole 143. The rod 720 penetrates the through hole 143. The main body 710 is in the first oil chamber 140 and is configured for sliding relative to the mandrel 100, so that the mandrel 100 can move close to or away from the base 600 by sliding relative to the piston 700. As a result, via hydraulic control, the rotation mechanism 10 can lift the mandrel 100 and this drives the tray 500 to go up and down.

Figure 3:
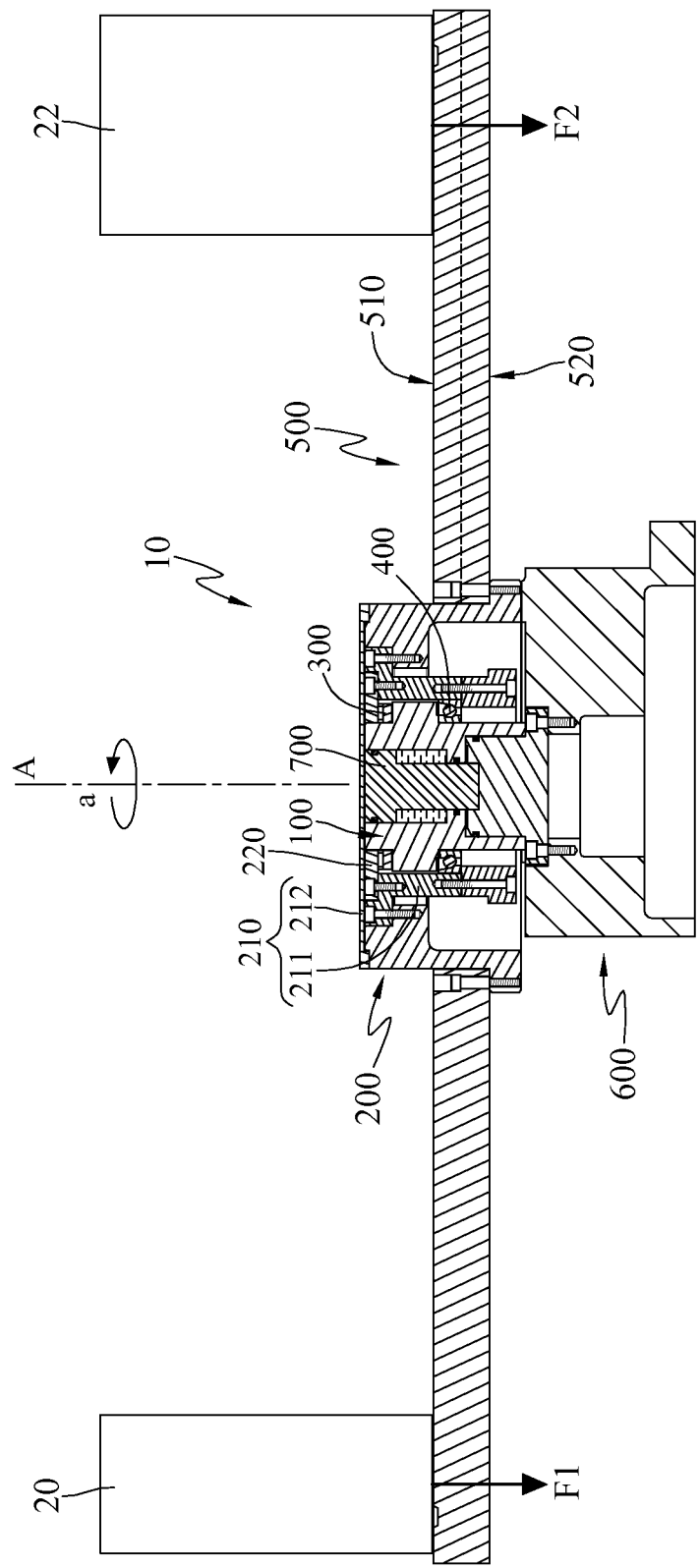
FIG. 3 is a sectional view of the rotation mechanism of FIG. 1 carrying a workpiece with uneven weight distribution.

FIG. 3 is sectional view of the rotation mechanism of FIG. 1 carrying a work piece with uneven weight distribution. As seen in FIG. 3, the tray 500 of the rotation mechanism 10 carries a first workpiece 20 and a second workpiece 22. The weight of the first workpiece 20 is less than the weight of the second workpiece 22. Assuming the distance between the center of gravity of the first workpiece 20 to the axis A of the mandrel 100 is equal to that between the center of gravity of the second workpiece 22 to the axis A of the mandrel 100, the force F1 applied by the first workpiece 20 on the tray 500 is less than the force F2 applied by the second workpiece 22 on the tray 500. This leads to uneven distribution of weight. These two forces result in the skew of the rotation axle 200 and therefore generate axial force and radial force between the rotation axle 200 and the mandrel 100. Moreover, when the rotation axle 200 rotates along the axis A of the mandrel 100 (along the direction of arrow a), the tray 500 generates radial force between the rotation axle 200 and the mandrel 100. It should be noted that the axial force herein refers to the force parallel the axis A of the mandrel 100, while the radial force herein refers to the force parallel to the radial direction of the mandrel 100.

The needle roller bearing 300 has great resistance of axial force, while the angular bearing 400 has great resistance of axial force and radial force. Hence, the needle roller bearing 300 is disposed on the position where a large portion of axial force exists, while the tray 500 is disposed on the position where both the axial force and the radial force exist. Thereby, this arrangement mitigates the skew of the rotation axle 200 and the abrasion between the mandrel 100 and the rotation axle 200, which improves the stability and the durability of the rotation mechanism 10.

Moreover, in this embodiment, only the needle roller bearing 300 and the angular bearing 400 are used (namely, fewer bearings are used than the conventional art), so the cost of the rotation mechanism 10 is reduced. Additionally, the needle roller bearing 300 and the angular contact ball bearing 400 are easy to install and this is likely to avoid deformation of the mandrel 100 and the rotation axle 200. Thereby, the rotation mechanism 10 can have better concentricity.

Figure 4:
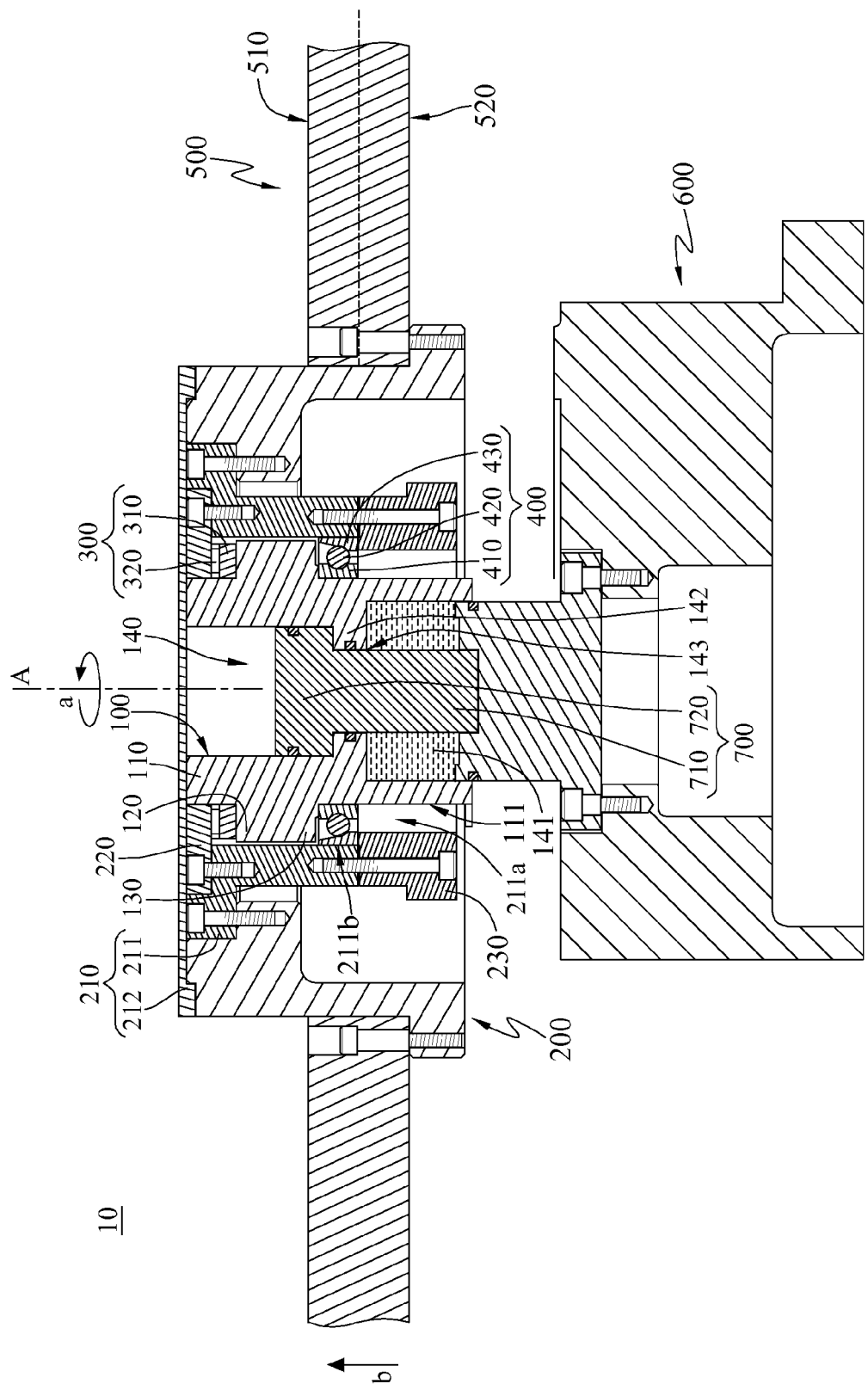
FIG. 4 is a sectional view of the rising rotation mechanism of FIG. 1.

FIG. 4 is a sectional view of the rising rotation mechanism of FIG. 1. As seen in FIG. 4, oil flows into the second oil chamber 141 by the hydraulic control, in order to make the mandrel 100 rise (along the direction of arrow b). The axial force is generated as the main body 710 of the piston 700 strikes the annular flange 142, and the needle roller bearing 300 can resist this axial force, thereby reducing the impact of the rising of the rotation mechanism 10.

To sum up, in the rotation mechanism of the disclosure, the axial force between the mandrel and the rotation axle is resisted by the needle roller bearing, and the axial force and the radial force between the mandrel and the rotation axle are resisted the angular bearing. This mitigates the skew of the rotation axle and the abrasion between the mandrel and the rotation axle, thereby improving the stability and the durability of the rotation mechanism.

Furthermore, since the vertical thickness of the needle roller bearing is small, the room for placing the objects on the mandrel and the rotation axle is enlarged.

What is claimed is:

1. A rotation mechanism comprising:
   a mandrel comprising a shaft portion, a first annular contact portion and a second annular contact portion, wherein the shaft portion has a outer surface, and the first annular contact portion and the second annular contact portion are located on the outer surface and respectively surround the axis of the mandrel;
   a rotation axle comprising an annular portion, a third annular contact portion and a fourth annular contact portion, wherein the annular portion has a shaft hole and an inner surface forming the shaft hole, the third annular contact portion and the fourth annular contact portion are located on the inner surface, and the mandrel passes through the shaft hole;

a needle roller bearing in contact with the first annular contact portion and the third annular contact portion, and being located between them; and an angular bearing in contact with the second annular contact portion and the fourth annular contact portion, and located between the outer surface and the inner surface.

2. The rotation mechanism according to claim 1, wherein the first annular contact portion has a first contact surface, the third annular contact portion has a third contact surface, the normal vector of the first contact surface and the normal vector of the third contact surface are parallel to the axis of the mandrel, and the needle roller bearing is located between the first contact surface and the third contact surface.

3. The rotation mechanism according to claim 2, wherein the needle roller bearing comprises a frame body and a plurality of needle rollers, the plurality of needle rollers are rotatably disposed on the frame body and the axes of the needle roller intersect and are perpendicular to the axis of the mandrel.

4. The rotation mechanism according to claim 1, wherein the second annular contact portion has a second contact surface, the fourth annular contact portion has a fourth contact surface, the normal vector of the second contact surface and the normal vector of the fourth contact surface are parallel to the axis of the mandrel, the angular bearing is located between the second contact surface and the fourth contact surface and is located between the outer surface and the inner surface.

5. The rotation mechanism according to claim 4, wherein the angular bearing is an angular contact ball bearing or an angular roller bearing.

6. The rotation mechanism according to claim 5, wherein the angular bearing is the angular contact ball bearing, the angular contact ball bearing comprises a first annular fixed frame, a second annular fixed frame and a plurality of balls, the second annular fixed frame surrounds the first annular fixed frame and the balls are rotatably disposed between the first annular fixed frame and the second annular fixed frame, the second contact surface and the outer surface are in contact with the two surfaces of the first annular fixing frame, respectively, while the fourth contact surface and the inner surface are in contact with the two surfaces of the second annular fixing frame, respectively.

7. The rotation mechanism according to claim 6, wherein the annular portion has an inner shell and an outer shell, the inner shell and the shaft hole are located on the inner shell, the outer shell surrounds and is fixed to the inner shell, the third annular contact portion is detachably installed on one side of the inner shell, while the fourth annular contact portion is detachably installed on the opposite side of the inner shell, and the third contact surface and the fourth contact surface are respectively connected to the opposite sides of the inner surface to form an angular groove.

8. The rotation mechanism according to claim 7, further comprising a tray, the rotation axle passing through the tray and the tray being fixed to the outer shell.

9. The rotation mechanism according to claim 8, wherein the tray has a carrying surface and a bottom surface that are opposite to each other, and the center of each of the balls is located between the extending surface of the carrying surface and the extending surface of the bottom surface.

10. The rotation mechanism according to claim 9, further comprising a base and a piston, wherein the piston has a main body and a rod, one end of the rod is connected to the base while the other end of the rod is connected to the main body, the mandrel is located on the base, the mandrel has a first oil chamber, a second oil chamber and an annular flange, the annular flange is between the first oil chamber and the second oil chamber, the annular flange has a through hole, the rod penetrates the through hole, and the main body is in the first oil chamber and is configured for sliding relative to the mandrel, so that the mandrel is capable of sliding relative to the piston, and therefore is able to move close to or away from the base.

11. The rotation mechanism according to claim 9, wherein the bottom surface faces the base, and the distance between the center of one of the balls and the carrying surface is less than the distance between the ball and the bottom surface.

* * * * *